Nov. 19, 1968 P. A. BYGDNES 3,412,217

RECORDER HEAD WITH ELECTRICALLY CONDUCTIVE FILLER WEDGE

Filed Jan. 27, 1965

INVENTOR.
PERRY ALAN BYGDNES

BY Gregg & Stidham

ATTORNEYS

United States Patent Office 3,412,217

Patented Nov. 19, 1968

3,412,217
RECORDER HEAD WITH ELECTRICALLY CONDUCTIVE FILLER WEDGE

Perry Alan Bygdnes, 3880 Bret Harte Drive, Redwood City, Calif. 94061

Filed Jan. 27, 1965, Ser. No. 428,341
8 Claims. (Cl. 179—100.2)

ABSTRACT OF THE DISCLOSURE

A recorder head made up of two pole pieces with complementary mating surfaces. In one mating surface there is a triangular segment of non-magnetic, electrically conductive material to prevent flow of flux and focus it in the gap outward of the segment. A right triangular notch is formed in the second pole piece, beginning at a point opposite the segment to provide a core for a coil. The pole pieces are secured in holders which are secured together by releasable means.

This invention relates to a recorder head and, more particularly, to a magnetic record and playback head of a recorder adapted for wide-band recording on a magnetic tape.

Many present recorder heads are of generally U-shaped configuration, with the gaps between them narrowing to infinitesimal lengths toward the open ends. In such configurations, the coil is formed by threading a wire through a small opening and around the closed end of the U-shaped recorder head. The wrapping is commonly done by use of optical magnification and frequently is an extremely tedious operation.

It is, therefore, an object of this invention to provide a recorder head on which the wire coil may be applied, removed and replaced quickly and easily.

A further disadvantage of present recorder heads resides in the fact that wear of the surface traversed by the magnetic tap produces a reduction from desired gap depth which cannot be corrected.

It is, therefore, a further object of this invention to provide a recorder head which can very easily be machined to restore the proper gap depth.

In carrying out this invention, I provide a pair of pole pieces that are formed from generally rectangular solid magnetic material. In one of these pole pieces a triangular notch is cut in one side and in the complementary side of the other pole piece a right trangular notch is cut with the hypotenuse of the right triangle sloping in from a point near one end of the pole piece. The triangular notch in the first pole piece is filled with a non-magnetic material to form the recorder head gap. The inwardly directed, right angle side of the right triangular notch forms, with the other end of the pole piece, a core for reception of the wire coil, which may be wound separately and inserted over the core. The pole pieces are then placed in holders and their complementary mating surfaces finished and their outer end working surfaces reduced until they are spaced from the triangular insert of non-magnetic material the desired gap depth. Then, a thin coating of non-magnetic material is deposited on at least one of the pole pieces to a thickness equal to the desired gap width and, after the coil is placed on the core, the holders are secured tightly together. If the outer end surface becomes worn and the gap depth reduced, one need merely remove the pole piece and grind the mating surface down to reduce the length of the exposed bottom surface of the triangular insert and, hence, increase the distance from the insert to the outer working face.

Other objects and advantages of this invention will become apparent from the description following, when read in conjunction with the accompanying drawings, wherein.

Figure 3A:
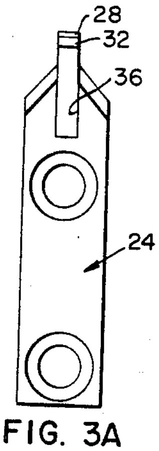
Figure 3B:
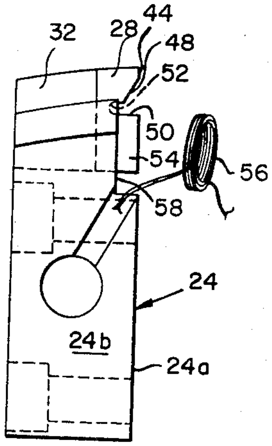
Figure 4A:
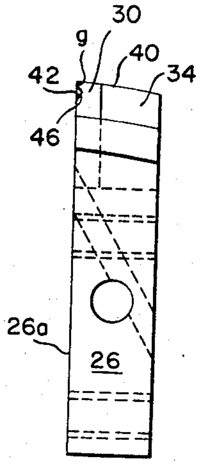
Figure 4B:
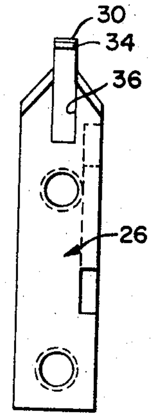
Figure 5A:
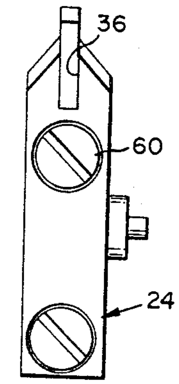
Figure 5B:
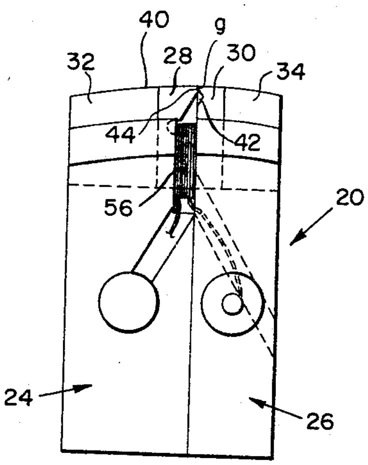
Figure 6:
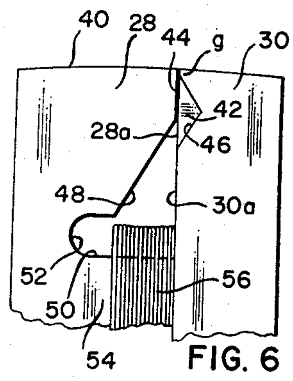

FIGS. 3*a* and 3*b* are end and side views of a pole piece and holder forming a part of the recorder head assembly;

FIGS. 4*a* and 4*b* are end and side views of pole piece and holder forming the other part of a recorder head assembly;

FIGS. 5*a* and 5*b* are end and side views of a complete recorder head assembly; and FIG. 6 is an enlarged partial view of the pole pieces forming a part of this invention.

Figure 1:
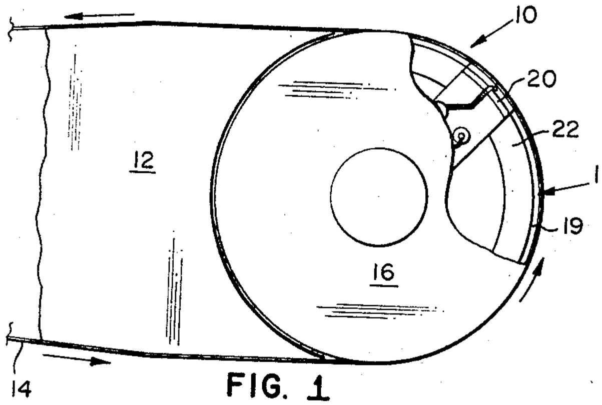
FIG. 1 is a plan view in more or less schematic form, showing a complete record head assembly in place in a tape transport.

Referring now to FIG. 1, there is shown generally a tape transport 10 including a stationary guide block 12 for directing magnetic tape 14 from a supply reel and driven capstan (not shown) to an idler roll 16 which is rotatably mounted to facilitate traversal of the tape past the stationary recorder head assembly 18. It is to be understood that the term "recorder head" as used in this application applies equally to a record head and a playback head and the recorder head assembly preferably includes both, although only one is shown. The recorder head assembly is secured within the idler roll 16 to extend into a circumferential slot 19 around the roll and into contact with the tape 14. The recorded assembly comprises a recorder head 20 of this invention secured on a stationary mounting disc 22.

In FIGS. 5*a* and 5*b*, the recorder head 20 is shown more clearly, and comprises a pair of holders 24 and 26 in which are mounted a pair of complementary pole pieces 28 and 30 which, together with non-magnetic filler blocks 32 and 34, are bonded, fused, or otherwise secured in slots 36 formed in the upper end of the holders 24 and 26. When so secured in place in the holders, the outer surfaces of the pole pieces 28 and 30 and the filler blocks 32 and 34 are lapped to a curved outer working surface 40 which may be a radius that is about .001 inch larger than that of the idler roll 16 so that the pole pieces extend through the circumferential slot 19. More particularly, the surface 40 is reduced until the desired gap depth, determined by the distance *g* from the arcuate upper surface 40 of the pole pieces to the upper end of a triangular insert of non-magnetic material 42 in the pole piece 30. The gap width is determined by the thickness of a non-magnetic coating 44 on the pole piece 28.

Figure 2:
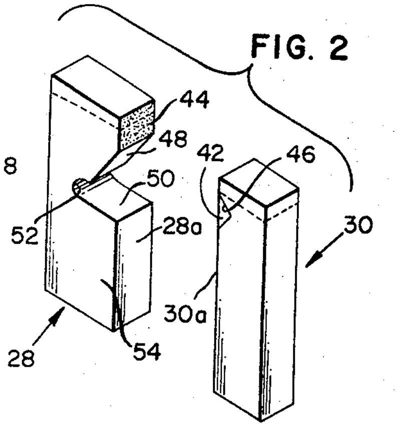
FIG. 2 is a view in perspective of the pole pieces forming a part of this invention.

In fabricating the recorder head, I first provide a pair of blocks 28 and 30 (FIG. 2) which are formed from suitable magnetic material. Adjacent surfaces 28*a* and 30*a* may be referred to a complementary mating surface, and from one of these surfaces 30*a* a triangular notch 46 is formed, as by lapping, and the portion removed is replaced by a non-magnetic filler material 42, such as silver solder, copper, brass or bronze which, besides being non-magnetic, are electrically conductive. From the other pole piece, a generally right-triangular notch 48 is cut, and the bottom surface 50 of the notch may be extended by a communicating notch 52 to form the upper surface of a core 54 upon which a coil 56 may be placed.

The pole pieces are placed within the slots 30 of the holders 24 and 26 and after the filler blocks 32 and 34 are placed, they are bonded or fused into place. A rectangular portion 58 at the upper right corner of the holder 24 is removed so that the pole piece coil core 54 protrudes and is directly accessible. The pole pieces are initially placed so that the mating surfaces thereof are substantially co-extensive with the mating surface 24*a* or 26*a* of the holder, but in any event, the holder and pole piece are together finished so that their surfaces are precisely co-planar. This finishing may be done by using a flat surface of the holder, such as the surface 24*b*, as an index, and the mating surface is finished precisely normal thereto.

The other pole piece 30 and holder 26 are similarly finished until perfectly flat and co-planar, the plane of the surface being determined visually when the upper and lower edges of the non-magnetic triangular prism filler 42 are parallel. When the pole pieces are so finished, it is desirable to deposit a thin coating of non-magnetic material 44, such as brass, platinum, glass or the like, on at least one of the complementary mating surfaces 28*a* and 30*a* in order to space them and provide the necessary gap between poles pieces. Such coating may be deposited to a thickness equal to the desired gap width, say 10 millionths of an inch, and is preferably placed only in the area 44 outside the right triangular notch 48 of the pole piece 28. By so localizing the coating, it will act as a shim, causing the elastic-restoring force of the metal of the pole piece 28 to compress the coating 44 and maintain the desired gap width.

In the meantime, the coil 56 is formed separately, as by winding copper wire or the like on a bobbin (not shown). Then, the coil may be coated with a hardenable plastic or the like to bind it into its coil form, and the coil merely slipped on the exposed coil core 54 of the pole piece 28. Thereafter, the holders may be secured tightly together by means of the screws 60, and, the coil ends connected to terminals by any suitable means.

The upper surfaces 40 of the pole pieces and spacer blocks are finished to the desired curvature forming a continuous working surface which is traversed by the magnetic tape. This surface is finished to provide the precise gap depth required, which is determined by the dimension *g* of the pole piece 30 from its upper working surface to the uppermost end of the triangular insert. This is preferably in the order of five ten-thousandths of an inch, and may be achieved by optical inspection.

In the event that the gap depth is reduced by wear of the working surface, it is merely necessary to separate the core holders and finish the mating surfaces 26*a* and 30*a* of the holder 26 and the right pole piece 30, to shorten the height of the triangular insert, thus shortening the width of the triangular base and, hence, increasing the distance *g* from the working surface 40 to the base of the triangular prism 42.

While this invention has been described in connection with preferred embodiments thereof, it is apparent that modifications and changes may be made by those skilled in the art without departing from the spirit and scope of this invention as defined by the claims appended hereto.

Having described my invention, I claim:

1. A recorder head comprising
first and second pole pieces having, respectively, first and second complementary mating surfaces,
means securing said pole pieces with said mating surfaces in face-to-face relationship and with adjacent ends thereof forming a continuous working surface,
a first inclined gap surface and a converging gap surface forming a wedges-like gap in said first complementary surface,
said first gap surface converging with said second complementary surface toward said working surface,
a filler of non-magnetic, electrically conductive material in said gap with an outer surface thereof co-planar with said first complementary surface, converging surfaces on said second pole piece intersecting with said second complementary surface opposite said first gap surface, forming a notch and, with the end of said second pole opposite said working surface, an open-end coil core,
a coil received on said core, and
means spacing said complementary surfaces.

2. The recorder head defined by claim 1 wherein:
said last-named means comprises a thin coating of non-magnetic material deposited on at least one of said complementary surfaces.

3. The recorder head defined by claim 1 wherein:
said last-named means comprises a thin coating of non-magnetic material deposited on said second complementary surface outward of said notch.

4. The recorder head defined by claim 1 wherein:
said notch is of generally right triangular configuration with the hypotenuse thereof inclining away from said second complementary surface from a point opposite said filler.

5. A recorder head comprising:
first and second pole pieces having, respectively, first and second complementary mating surfaces,
a thin coating of non-magnetic material on at least one of said complementary surfaces,
means securing said pole pieces together with said complementary surfaces engaging in face-to-face relationship and with adjacent ends thereof forming a continuous working surface,
a triangular segment of non-magnetic material in said first pole piece with a surface thereof co-planar with said first complementary surface, and with another side thereof converging with said first complementary surface toward said working surface,
converging surfaces on said second pole piece forming a generally right triangular notch in said second pole piece with a side thereof converging with the second complementary surface toward said working surface and merging therewith at a point opposite said segment, and with a second side disposed generally parallel to the side of said pole piece opposite said working surface to form a coil core therewith, and
a coil received on said core.

6. The recorder head defined by claim 5 wherein:
said working surface is of convex, arcuate configuration.

7. The recorder head defined by claim 5 including:
first and second holders,
means securing said first and second pole pieces, respectively, on said first and second holders with said complementary surfaces flush with mating surfaces on said holders, and
releasable means securing said holders together.

8. The recorder head defined in claim 5 wherein:
said triangular segment is of electrically conductive material.

References Cited

UNITED STATES PATENTS

| | | | |
|---|---|---|---|
| 3,058,200 | 10/1962 | Duinker et al. _____ | 179—100.2 |
| 3,340,518 | 9/1967 | Hanson __________ | 179—100.2 |
| 3,354,540 | 11/1967 | Duinker __________ | 179—100.2 |

BERNARD KONICK, *Primary Examiner.*

H. STECKLER, *Assistant Examiner.*